United States Patent [19]

Lewis

[11] Patent Number: 5,631,889
[45] Date of Patent: May 20, 1997

[54] OPTICAL STORAGE APPARATUS WITH A FOCUSED MASS STORAGE MEDIUM

[76] Inventor: Ralph S. Lewis, 14122 S. Hindry Ave., Hawthorne, Calif. 90250

[21] Appl. No.: 512,539

[22] Filed: Aug. 8, 1995

[51] Int. Cl.⁶ .................................................. G11B 7/24
[52] U.S. Cl. .................... 369/114; 369/125; 369/280; 369/275.2
[58] Field of Search ..................... 369/13, 284, 288, 369/283, 126, 114, 125, 280, 275.2

[56] References Cited

U.S. PATENT DOCUMENTS

| | | | |
|---|---|---|---|
| 5,163,039 | 11/1992 | Lindmayer | 369/100 |
| 5,184,322 | 2/1993 | Okun et al. | 369/13 |
| 5,420,846 | 5/1995 | Sugiyama | 369/288 |
| 5,474,874 | 12/1995 | Asai et al. | 369/284 |
| 5,475,213 | 12/1995 | Fujii et al. | 369/284 |
| 5,502,706 | 3/1996 | Yang et al. | 369/288 |

*Primary Examiner*—Georgia Y. Epps
*Assistant Examiner*—Kim-Kwok Chu

[57] ABSTRACT

An optical data storage apparatus having a focused mass storage medium which remains or rotates in focus about a focal point as data signals are transferred to and from the storage medium. The geometry of the focused mass storage medium permits greater data storage capacity while providing immediate data transfers due to the elimination of travel mechanisms commonly used to align the signal. Further, the apparatus is capable of transferring its entire data storage per rotation of the medium.

6 Claims, 2 Drawing Sheets

OPTICAL STORAGE APPARATUS WITH A FOCUSED MASS STORAGE MEDIUM

BACKGROUND—FIELD OF THE INVENTION

This invention relates to optical mass data storage devices, and more particularly to an optical storage device with a mass data storage medium or pixel region that remains in focus about and/or rotates into focus about a focal point or locus of focal points as data is transferred to and from the storage medium by means of a signal such as produced by a laser.

BACKGROUND—DESCRIPTION OF PRIOR ART

Data storage systems typically store data magnetically or optically onto several types of storage media such as rotating magnetic or optic disks. This type of storage media may include those which permit recording, retrieval and erasure of information. The data stored on such media is contained within a series of spiral or concentric tracks about the disk center and may number into the thousands of tracks per disk side.

Current optical mass storage devices employ an optical assembly comprised of an objective lens to record data by focusing a signal onto the media surface as the mass storage medium is rotated on a spindle. The signal is then aligned radially to scan the media. The signal is typically generated by a semiconductor laser or other suitable signal source. The signal may be either reflected by the media or transmitted through the media. When reflected from the media the signal passes again through the objective lens and is then detected by a photodetector or other suitable detector. A detected signal is then processed to extract the information contained therein. A second function of the optical assembly is to derive tracking and focusing signals. Optical assemblies of this type are provided with a focusing servomechanism to detect and maintain a focusing state for the objective lens and a tracking servomechanism for detecting a tracking guide, continually directing the objective lens towards a desired track.

Using current optical and magneto-optical mass storage devices, data transfer is delayed by the time required for servomechanically aligned read/write heads to seek and find the correct location of data on commonly used media with flat surfaces such as disks. In an attempt to speed up the data transfer process, the stationary storage medium in U.S. Pat. No. 6,184,322 to Okun et al., Feb. 2, 1993, severely limits the storage area to the field of view of a scanning means which is further limited by blind areas generated behind the various angled grooves cut in the storage medium required to focus the signal beams.

As described in this section, the current technology commonly in use today suffers from a number of disadvantages such as:

(a) their data storage is limited by the geometry of the data storage field or pixel region;

(b) their optical assemblies are comprised of numerous bulky components requiring complex assembly and adjustment; and (c) their ability to transfer data is delayed during the movement of components within the data transfer operation.

OBJECTS AND ADVANTAGES

Accordingly, several objects and advantages of my invention are:

(a) to provide a data storage device with geometry allowing for a superior data storage capacity;

(b) to provide a data storage device which allows data storage on the surface of and/or within a storage medium using a superior data recording format;

(c) to provide a data storage device which allows each pixel domain within a storage medium or pixel region to record numerous levels of reflectivity;

(d) to provide a data storage device which eliminates movement of components during a data transfer operation;

(e) to provide a data storage device with a data storage medium that is manually interchangeable;

(f) to provide a data storage device which reduces the seek time in locating and transferring desired data;

(g) to provide a data storage device the geometry of which allows for data transmission to and from an entire storage medium per axial rotation of the storage medium and/or a scanning device, such as a pivotal mirror; and Further objects and advantages are to provide a data storage device which is widely useable, cost effective to manufacture, and is easily supplied to a variety of market places. Still further objects and advantages of my invention will become apparent from a consideration of the drawings and ensuing description.

SUMMARY OF THE INVENTION

The present invention is an improved optical mass storage device which performs reading, writing and erase functions more rapidly and at greater data storage capacity than that of current optical storage devices.

The present invention uses a signal capable of being focused at a single data area or pixel domain on the surface of, or within the pixel region of the storage device. The reading function directs a signal of fixed intensity which reflects from the pixel region to a receiving means of detection and processing to extract the information. A coding methodology may be utilized in the writing process which allows each multiple state pixel domain to record more than two levels of reflectivity such as from a ground state to an nth state, thereby increasing further the storage capacity. Said coding methodology includes a tracking and focusing means.

The present invention may utilize currently available signal sources such as lasers for reading that do not alter the data. Writing signals may be similar to those used for reading, however, the signal must be of a sufficiently higher energy level or combined with an additional energy source such as from a magnetic field generator to alter the media according to the coding methodology. An erase process may be performed by such means as "bleaching" a desired data location with a signal capable of reversing the altered state induced by the write signal by "bumping" the selected data location of the pixel region back to a ground state for example. Another erasing processes that may be utilized is the combining of a signal with a magnetic field generator of reverse polarity to that polarity which may have been used in the writing process. It should be noted that only the write and erase procedures need alter the data.

The composition of a preferred embodiment may include a radiant energy-active storage means such as a light sensitive means and/or magneto-optical means of actuating detectable data such as by currently available emulsions supported on or within a substrate. Rotation of the pixel region or rotation of an optically reflective means for directing the signal to the pixel region may be accomplished by such means as mounting said components to a synchronized motor driven spindle.

In accordance with the principles of the present invention, a signal is directed at the storage medium by means of a typical optical assembly which may include such means as focusing lenses, mirrors, reflective, refractive, scanning, receiving, detection and other such optical means for manipulating signals, and may collectively be referred to herein as the optical system. The entire pixel region may either remain in focus about, or rotate into focus about, a preferred focal point or a locus of focal points. Prior art servomechanical actuators required to align the optical system or a separate read/write head are eliminated and thereby speed up the data transfer process.

Accordingly, a superior feature of this invention is a geometric focusing and scanning system which permits location of a signal source and stationary optical system off of the mass storage medium such that a signal may transfer data radially to or from the entire pixel region per axial rotation of the storage medium or per rotation of a means for reflecting said signal to and from the pixel region, such as by a pivotal mirror scanning device.

The data storage field or pixel region may be either upon the surface of the medium or permeate the medium in three dimensions. An embodiment of the invention has curvature in at least two directions. For example, a primary curvature defines the focus and location for the optical system, while a secondary curvature alters the angle of reflection and focal distance between adjacent data and the optical system such that data may be stored much closer without interfering with the transfer of selected data. This is a problem which occurs with the current technology.

Several techniques of scanning the pixel region are possible including, but not limited to:

a. arranging a number of discrete signals about the locus of focal points of the pixel region;

b. using a variable lens, such as a piezoelectric crystal lens;

c. using a rotating mirror synchronized with the signal; and d. using a pivotal mirror with a rotating medium.

The number of writing variations and formats usable by the present invention are nearly infinite due to the geometry of the storage medium. For example, and not meant as a limitation hereof, data may be recorded in such formats as:

a. concentric about the axis of the storage medium;

b. latitudinally within a plane containing the axis of the storage medium;

c. spiral about the axis of the storage medium; and d. helical about the axis of the storage medium.

Although these examples refer to the axis of the storage medium it should be noted that every described track of data, except for the spiral format, either remains in focus about or rotates into focus about the previously described focal point or locus of focal points of the primary curvature of the pixel region of the storage medium.

Another object and advantage of this invention is the ability to record data latitudinally or latitudinally with a minimal helical twist which allows a single scanning signal to transfer data to and from the entire pixel region with every rotation of either the storage medium or rotation of an optical means such as a pivotal mirror.

All components comprising the entirety of a preferred embodiment may be appropriately assembled and mounted primarily on the interior surfaces of any such device providing a sufficient housing. Those components that may be interchangeable, such as the data storage media, may use an interlocking and/or fastening means comprised of an element for self alignment.

DESCRIPTION OF THE INVENTION

Figure 1:
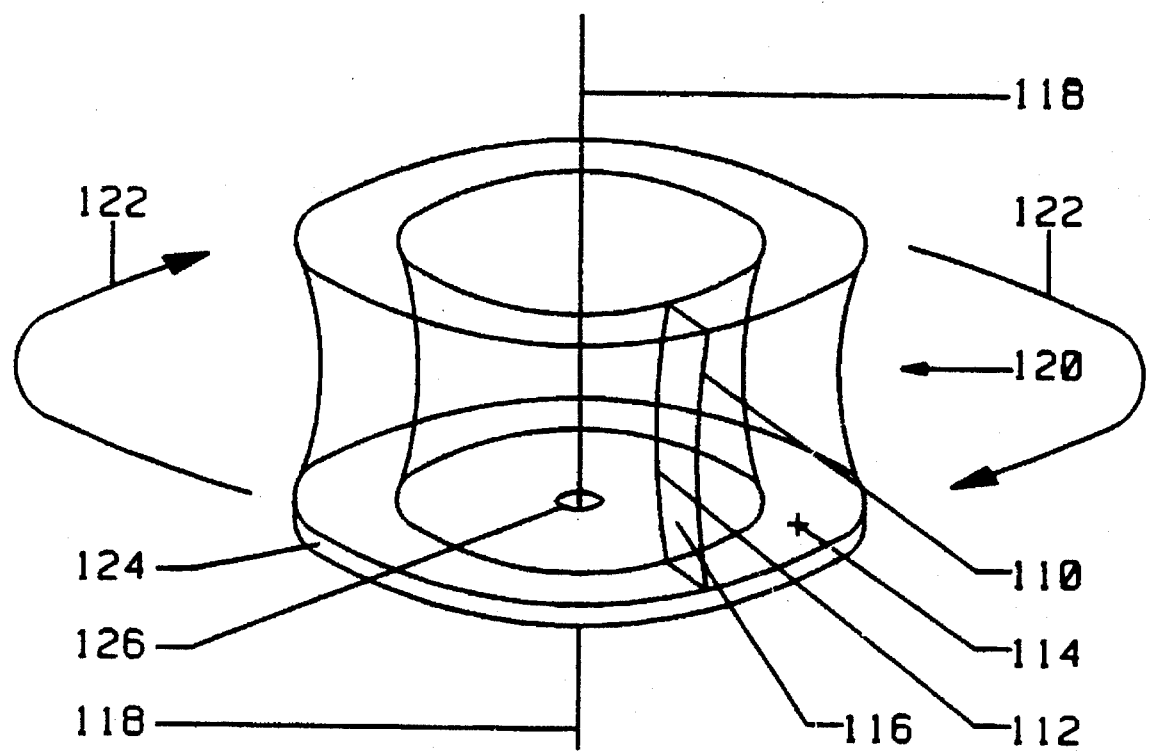
FIG. 1 is an isometrical transparent illustration representing the geometry of an optical mass data storage device with a nontransparent mounting base.

FIG. 1 is a transparent isometrical illustration representing the geometry of an optical mass data storage device with a nontransparent mounting base.

A prime arc 110 and a second arc 112 within the same plane have a common prime focal point 114 represented by a "+" for reference. Connecting the ends of prime arc 110 to the ends of second arc 112 defines a prime plane 116. Rotating prime plane 116 about an axis 118 generates a plurality of planes describing a data storage area or pixel region of the invention such as pixel region 120. Said rotation causes prime focal point 114 to trace a locus of focal points 122 illustrated as a discontinuous path but should be understood as a continuous plurality of focal points. One end of pixel region 120 is attached by such means as an adhesive cement (not shown) to the surface of a mounting base 124 which has a spindle bore 126 through its center.

Rotating pixel region 120 about axis 118 one complete rotation thereby perpendicularly exposes separately every plane such as the prime plane 116 to every focal point such as the prime focal point 114 of that locus of focal points 122.

Figure 2:
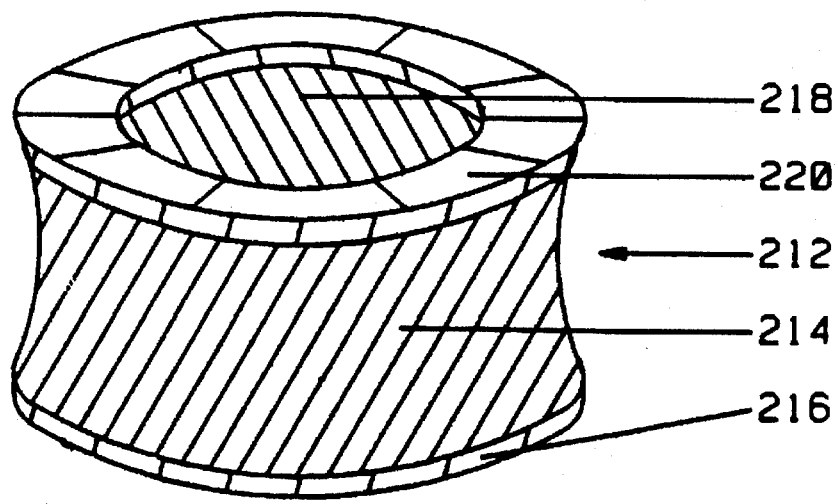
FIG. 2 illustrates an embodiment of FIG. 1 comprised of an emulsified substrate showing a pixel region with pixel domains.

FIG. 2 is an illustration of an embodiment of FIG. 1 comprised of an emulsified substrate showing a pixel region with pixel domains.

Given the geometry of an optical mass data storage device of FIG. 1, an embodiment of a pixel region 212 of the device employs a radiant energy-active storage means such as a light sensitive emulsified substrate comprised of suspended silver crystals. Pixel region 212 is comprised of individual pixel domains such as pixel domain 214 in accordance with the principles of the invention. Each pixel domain such as pixel domain 214 of pixel region 212 is capable of recording a plurality of reflectivity levels according to a coding methodology employed to define and differentiate data such as from a ground state to an nth state.

One end of the embodiment of pixel region 212 of the device is attached by such means as with an adhesive cement (not shown) to the surface of a mounting base 216 which has a spindle bore such as that of spindle bore 126 of FIG. 1.

An interior surface of pixel region 212 is coated with a signal noise reducing means such as a signal dampening material 218 thereby eliminating extraneous signal noise.

The end of the embodiment of said device opposite the mounting base 216 employs a protective and handling means such as a cap 220 which is fitted to slip thereupon.

Figure 3:
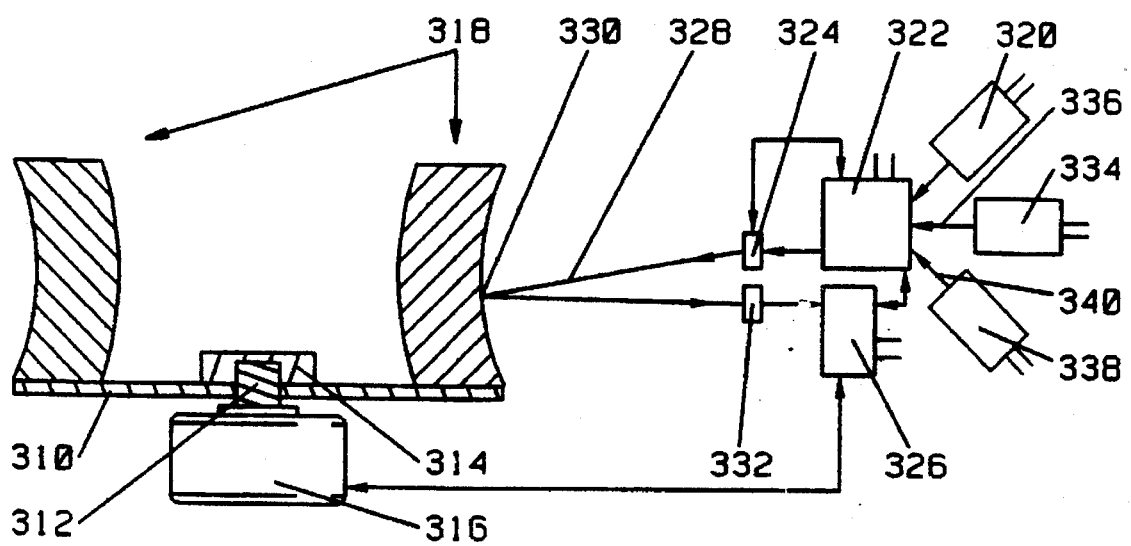
FIG. 3 is a cross sectional view of FIG. 2 with a schematic diagram of an optical mass data storage system illustrating a write function of the system showing a piezoelectric crystal lens scanning device and spindle motor.

FIG. 3 is a cross sectional view of FIG. 2 with a schematic diagram of an optical mass data storage system illustrating a write function of the system showing a piezoelectric crystal lens scanning device and spindle motor.

An optical mass data storage device such as a device of FIG. 2 is mounted axially through a bore, such as spindle bore 126 of FIG. 1, in a mounting base 310 on a spindle 312 and secured by such means as with an interlocking guide 314. A drive system such as spindle motor 316 and means for conveying rotational energy such as spindle 312 provide successive angular displacement so as to synchronously rotate a pixel region 318 during a data transfer operation.

In a write process, a write laser transmitter 320 emits a write signal 328 at an optical system 322 which focuses the write signal 328 through a scanning device such as a piezoelectric crystal lens scanning device 324 which directs the write signal 328 onto the pixel region 318 striking and exciting an individual pixel domain such as pixel domain 330 and thereby alters its reflectivity level in accordance with the principles of the invention and a coding methodology employed to define and differentiate data. The write signal 328 then reflects off pixel domain 330 through a focusing lens 332 and onto a signal processing receiver 326 whereby the write signal 328 is processed.

In a read process, the same procedure is followed as that for the write process above except that a read laser transmitter 334 emits a read signal 336 at the optical system 322 from where the read signal 336 then follows that same optical path as the write signal 328.

In an erase process, the same procedure is followed as that for the write process above except that an erase laser transmitter 338 emits an erase signal 340 at the optical system 322 from where the erase signal 340 then follows that same optical path as the write signal 328, thereby reversing the altered state induced by said write process.

Figure 4:
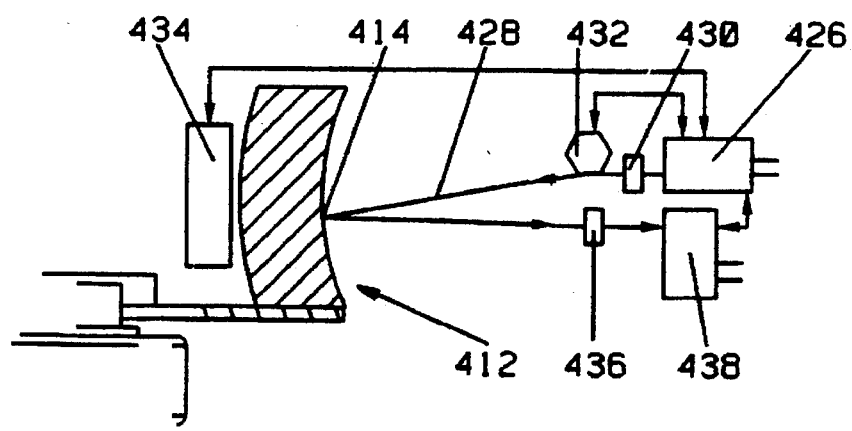
FIG. 4 is a partial cross sectional view of FIG. 2 with a schematic diagram of an optical mass data storage system illustrating a read function of the system showing a rotating mirror scanning device and a magnetic field generator.

FIG. 4 is a partial cross sectional view of FIG. 2 with a schematic diagram of an optical mass data storage system illustrating a write function of the system showing a rotating mirror scanning device and a magnetic field generator.

An optical mass data storage device of FIG. 2, except that the photosensitive means of FIG. 2 which now employs a magneto-optical emulsified substrate comprised of suspended and partially reflective metallic crystals, provides an embodiment for pixel region 412, in accordance with the principles of the invention.

In a write process, a laser transmitter 426 emits a signal 428 through a first focusing lens 430 to a rotating mirror scanning device 432 which directs signal 428 onto the pixel region 412 striking a pixel domain 414 with a magnetic field generator 434 in a write polar mode thereby altering the reflectivity of pixel domain 414 in accordance with the principles of the invention and as defined by the coding methodology employed to define data. Signal 428 then reflects off pixel domain 414 and through a second focusing lens 438 onto a signal processing receiver 438 where signal 428 is processed.

In a read process, the same procedure is followed as that of the write process above except that the magnetic field generator 434 is in a nonactive mode which allows signal 428 to scan all or portions of pixel region 412 such as pixel domain 414 without altering its reflectivity level or data content.

In an erase process, the same procedure is followed as that of the write process above except that the magnetic field generator 434 is in an erase polar mode, which has a reverse polarity than that of the write polar mode previously described. The reflectivity of pixel domain 414 is thereby altered in accordance with the coding methodology employed defining pixel domain 414 erased.

It should be noted that the signal dampening material 218 of FIG. 2 does not alter the performance of the magnetic field generator 434.

SUMMARY, RAMIFICATIONS AND SCOPE OF INVENTION

Thus the reader will see that the optical mass data storage medium of the invention provides a superior data storage capacity with a faster data transfer capability and can be used with such devices as computer systems, tele-video systems and video recording equipment.

While my description above contains many specificities, these should not be construed as limitations on the scope of the invention, but rather as an exemplification of preferred embodiments thereof. Many other variations are possible. For example, the invention could be operated with both internal and external optics or just internal optics, and could have a pixel region with a horizontal orientation to the axis rather than the vertical herein. Accordingly, the scope of the invention should not be determined by the embodiment/s illustrated, but by the appended claims and their legal equivalents.

What I claim as my invention is:

1. An apparatus for the storage of data, comprising:

means for producing a signal;

optical system means for manipulating and directing said signal;

storage medium comprising storage domains having radiant energy-active storage means for storing data;

said storage medium having at least one focal point from whereabouts said signal is directed to and received from said storage medium as said storing data by means of said optical system;

said storage medium further having curvature in at least two directions such as a primary curvature which geometrically defines the focus of said storage medium providing location/s for said focal point, and a secondary curvature generated about a symmetrical axis of said storage medium, whereby, said secondary curvature geometrically alters angles of reflection from adjacent storage domains of said storage medium from an angle of reflection from a selected storage domain of said storage medium with respect to said focal point and said symmetrical axis during a signal transfer operation;

drive system means for synchronizing the manipulation of said signal from said focal point about said storage medium during a signal transfer operation; and said optical system includes a signal receiving device means for receiving and processing said signal from said storage medium during said signal transfer operation.

2. The apparatus for the storage of data of claim 1, wherein said means for producing a signal further comprises:

means for producing a write signal for selectively altering the reflectivity state of said storage domains;

means for producing a read signal for scanning said storage domains so as to retrieve data; and means for producing an erase signal for reversibly altering said altered state induced by said write signal of selected storage domains.

3. The apparatus for the storage of data of claim 1, wherein said optical system means for manipulating and directing said signal further comprises:

a signal coding methodology means for defining and producing differentiated data which said coding methodology includes a tracking and focusing means;

a signal focusing device means;

a signal scanning device means; and a signal processing receiver device means.

4. The apparatus for the storage of data of claim 1, wherein said storage medium further comprises:

storage domains employing radiant energy-active storage means for recording a plurality of reflectivity levels, such as from a ground state to an nth state, thereby increasing data storage capacity of each storage domain;

storage domains permeating the storage medium in three dimensions; and a locus of focal points.

5. The apparatus for the storage of data of claim 1, wherein said drive system means for synchronizing the manipulation of said signal from said focal point about said storage medium during a signal transfer operation further comprises:

a motor;

means for conveying rotational energy; and an interlocking guide device means for securing said storage medium.

6. The apparatus for the storage of data as defined in claim 1 capable of transferring a signal to and receiving a signal from the entire storage medium per axial rotation of either the storage medium or per rotation of a means for directing a signal to and receiving a signal from the storage medium such as by a pivotal mirror scanning device.

* * * * *